United States Patent
Giallorenzi et al.

[11] 3,757,247
[45] Sept. 4, 1973

[54] FREQUENCY SELECTIVE OPTICAL ISOLATOR

[75] Inventors: Thomas G. Giallorenzi, Alexandria; Michael H. Reilly, Fairfax, both of Va.

[73] Assignee: The United States of America as represented by the Secretary of the Navy

[22] Filed: June 22, 1972

[21] Appl. No.: 265,126

[52] U.S. Cl. .......................... 331/94.5, 356/106 LR
[51] Int. Cl. ................................. H01s 3/08
[58] Field of Search ........................... 331/94.5; 356/106 LR

[56] References Cited
UNITED STATES PATENTS
| | | | |
|---|---|---|---|
| 3,617,129 | 11/1971 | Skolnick | 356/106 |
| 3,691,477 | 9/1972 | Janney | 356/106 |
| 3,646,469 | 2/1972 | Buczek et al. | 356/106 |

Primary Examiner—William L. Sikes
Attorney—R. S. Sciascia, Arthur L. Branning et al.

[57] ABSTRACT

A traveling wave optical oscillator (LASER) in a ring cavity. The system provides loss or gain in the cavity field in order to provide loss or gain in one direction in a two direction system.

4 Claims, 1 Drawing Figure

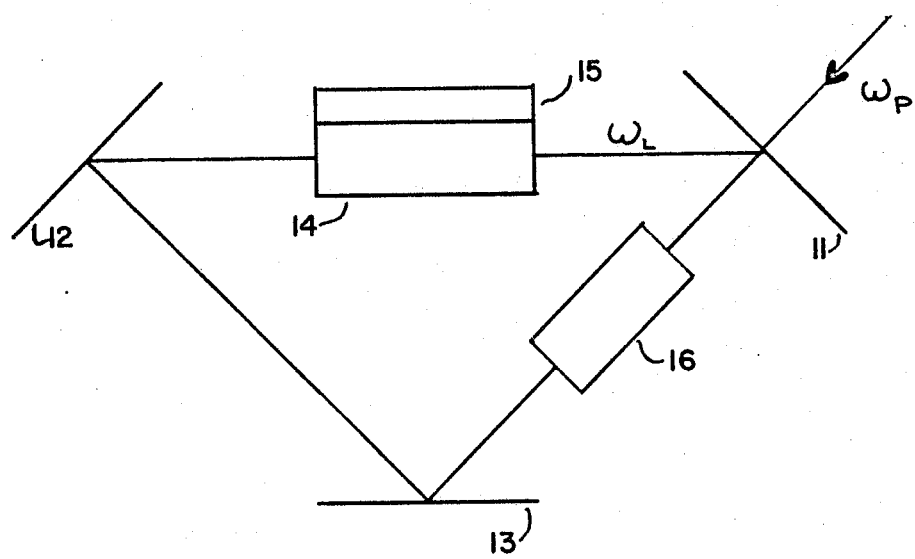

FREQUENCY SELECTIVE OPTICAL ISOLATOR

BACKGROUND OF THE INVENTION

This invention relates to traveling wave oscillators and more particularly to a frequency selective optical isolator.

Heretofore, traveling wave oscillators have been built with only one direction of propagation which employed passive loss type isolators such as described in "Lasers, Light Amplifiers and Oscillators" by D. Ross, pages 87 and 245. Such oscillators provide loss in one direction of cavity propagation, but are not frequency selective. These isolators are only able to provide passive loss to waves traveling in a given direction and thus can not be used to selectively allow wave propagation in a given direction by providing additional gain for the given direction. Other such traveling wave oscillators have been described in the literature and are well known in the art.

SUMMARY OF THE INVENTION

The system is directed to a ring cavity which is formed by three mirrors including a gain medium between two mirrors and a nonlinear crystal between two other mirrors. Each of the mirrors are suitably reflective at the oscillator frequency and one of the mirrors is coated such that external radiation of a desired frequency may pass from the back side into the optical path and be incident on the nonlinear crystal through which it passes. Through the up-conversion or down-conversion process, gain or loss may be provided to one beam direction in order to select wave travel in a desired direction.

STATEMENT OF THE OBJECTS

It is therefore an object of the present invention to provide a traveling wave oscillator in which lasing with a traveling wave going in a desired direction may be obtained.

Another object is to provide a traveling wave ring cavity in which oscillation is frequency selective.

Yet another object is to select the direction of wave propagation by up-conversion or by down-conversion.

Other objects of the invention will become obvious from a careful review of the following specification considered with the drawing.

BRIEF DESCRIPTION OF THE DRAWING

The drawing is a diagramatic view of the system.

DESCRIPTION OF THE SYSTEM

Now referring to the drawing, there is shown a diagramatic view of the system which illustrates the relative parts. As shown, the system illustrates a ring cavity formed by three mirrors 11, 12 and 13 angularly spaced to reflect light between each other in an optical path. A gain medium such as a laser 14 that includes a pumping means 15 is positioned in the optical path between two mirrors 11 and 12. A non-linear crystal 16 such as $LiNbO_3$ lithium metaniobate, ADP, ammonium dihydrogen phosphate, or KDP, potassium dihydrogen phosphate, is placed in the optical path between mirrors 11 and 13. One mirror, 11, is a double acting mirror which is coated to reflect the oscillator frequency $\omega_l$ and to transmit the desired input radiation of frequency $\omega_p$. Therefore, pump radiation, $\omega_p$, may be added to the optical path of the radiation being reflected around in the ring cavity by the laser medium.

In a ring cavity such as shown in the drawing traveling waves are set up which travel in both directions, that is, clockwise and counter clockwise.

If the gain of the waves traveling in both directions in the cavity is greater than the losses, then the oscillator will oscillate. When it is desired to obtain lasing with a traveling wave going in a single direction, it is necessary to provide, selectively, gain in this direction and/or loss in the other direction. Such gain and/or loss may be obtained by the well known parametric process. Therefore, to limit oscillation to one direction of propagation only, it is necessary to provide a selective loss to the wave in the undesired direction which will put the wave in the undesired direction below threshold. This may be done by use of the non-linear medium through the up-conversion process. In this process, a second light beam such as the pump beam, $\omega_p$, is directed through the mirror, 11, into the non-linear medium. The interaction of the pump radiation with the laser radiation in the cavity either converts the radiation from the beam propagating in the undesired direction to another frequency outside the gain bandwidth of the laser ($\omega_p + \omega_l \rightarrow \omega+$), which can thus no longer be amplified, or it converts to another polarization which has high cavity loss. In each case, the radiation traveling in the undesired direction selectively sees loss which the wave traveling in the desired direction does not see. The loss in radiation being large enough, oscillation will occur only with the wave in the desired direction. Thereby only one wave in the desired direction propagates in the cavity.

In the event the wave in the desired direction does not oscillate, due to excessive losses, then through the parametric down-conversion process additional gain can be given to the wave traveling in the desired direction.

Through the parametric down-conversion process, a pump photon is converted to a photon of the desired frequency $\omega_p = \omega_l + \omega-$. This conversion of pump photons to photons within the gain bandwidth of the ring laser is a selective means of increasing the gain of a wave traveling in the desired direction. In this case the wave in the undesired direction does not have sufficient gain to oscillate and will not so operate.

The system operates for different wavelengths by changing the characteristics of the nonlinear crystal by heat, electric fields, crystal rotation, etc., depending on the particular nonlinear crystal used. Changing of the characteristics of the nonlinear crystal is well known in the art and has not be specifically described herein.

Therefore, from the above, it is seen that a frequency selective filter may be used either as a loss or gain mechanism to select direction of propagation of a wave oscillator system.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A frequency selective optical isolator; which comprises, first, second and third mirrors, spaced from each other and positioned to form a triangular optical path, a radiation gain medium positioned in the optical cavity, a nonlinear crystal positioned in said optical cavity, one of said mirrors having a reflective coating for the desired oscillator radiation and being transparent at the desired input frequency.

2. A frequency selective optical isolator as claimed in claim 1; in which, said nonlinear crystal is selected from a group consisting of $LiNbO_3$, ADP, and KDP.

3. A method of limiting oscillation to one direction of propagation only in a ring cavity which has traveling waves set up which travel in both directions in the optical path, which comprises, providing selectively gain to the wave traveling in the desired direction by the parametric process, and providing selectively loss to the wave traveling in the undesired direction of travel by the up-conversion process.

4. A method as claimed in claim 3; in which, the parametric process is the down-conversion process.

* * * * *